Patented Feb. 24, 1931

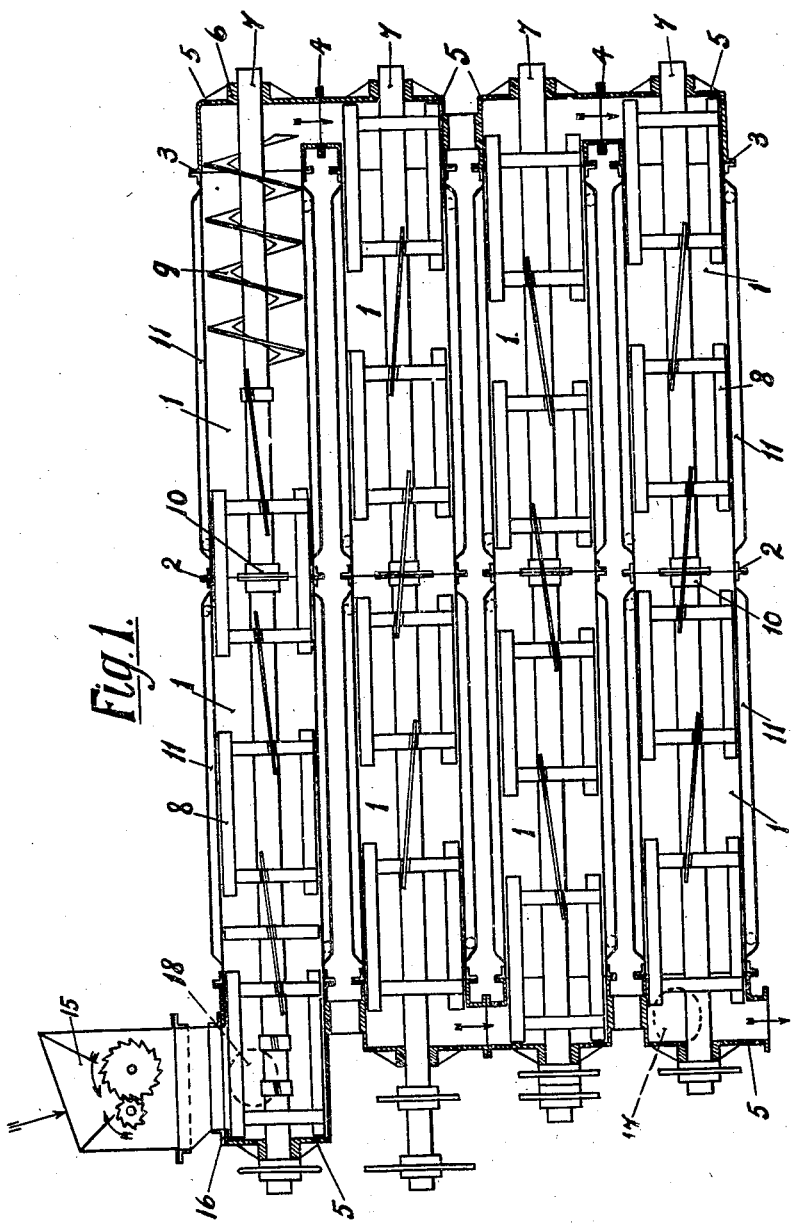

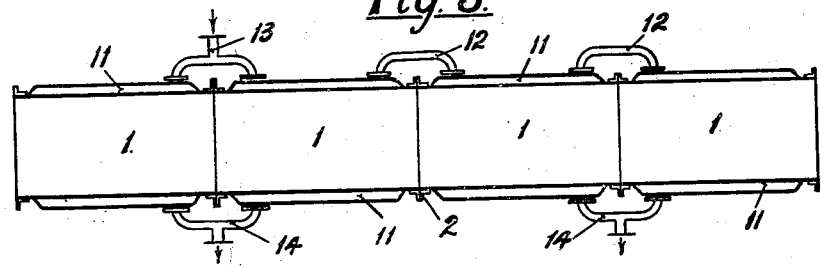
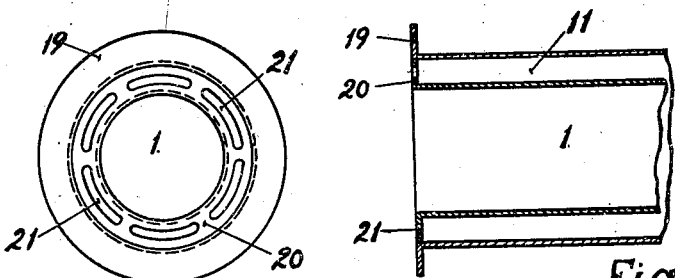
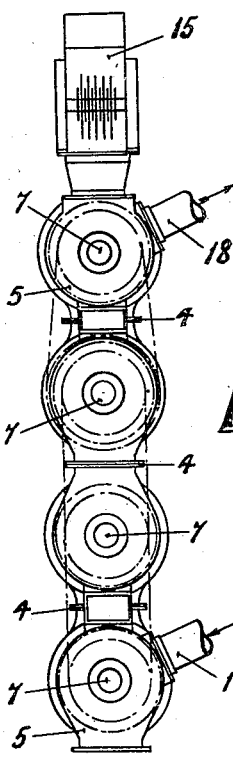

1,793,638

UNITED STATES PATENT OFFICE

HAROLD STANLEY ROWTON, OF ABERDEEN, SCOTLAND, AND VOLKMAR WALTER HÄNIG, OF DRESDEN, GERMANY

CONSTRUCTION OF FISH-MEAL PLANTS

Application filed April 22, 1929, Serial No. 357,250, and in Great Britain April 26, 1928.

This invention relates to apparatus for drying or treating fish, fish offal and other fish materials in the production of fish powder or fish meal and more particularly to continuously-operating fish metal plants of the kind comprising a plurality of tubular drying chambers or cylinders parallel with one another and connected end to end in series or in parallel and preferably arranged horizontally one above another, the drying chambers being fitted with steam or other heating jackets and with agitating or agitating and conveying apparatus by shafting extending centrally through the drying cylinders.

In such fish meal plants, the drying cylinders are frequently of considerable length and vary in diameter from perhaps 15 inches upwards according to the capacity of the plant. In consequence thereof, they are extremely heavy to transport, require special transport facilities, and are very difficult to erect owing to their great size and weight. It has been found commercially very difficult and in some cases impossible to install such fish meal plants in fishing vessel, such as trawlers, whalers and the like, owing to the structural alterations involved in getting the plant into the vessel into position for erection.

It is therefore one of the objects of the present invention to construct a fish meal plant of the kind described which can be easily transported and erected either on land or on sea-going vessel.

For convenience of construction it has been proposed to make the jacketed drying chambers in two sections joined by a flanged joint and to make the end connections in two sections secured together and to the ends of the drying cylinders by flanged joints whilst paddle shafts which are continuous from end of the drying cylinders are supported in shaft bearings secured to the sides of the end connections.

It is also known to build up a long single steamjacketed drying cylinder in sections and to make the paddle shaft in two halves connected by a central coupling.

The present invention relates to the construction of fish meal plant of the kind described in sections and consists in making the tubular drying or other chambers or cylinders in which the fish material is treated, together with the steam jackets in sections of a convenient length for transport and erection or assembly and adapted to be bolted or otherwise detachably coupled together end to end, each section of jacketed drying chamber being provided with a central shaft section fitted with agitating or agitating and conveying devices, said shaft sections corresponding to the length of each jacketed drying chamber section and being adapted to be coupled together by suitable couplings.

The end sections of the drying chambers may be constructed complete with shaft bearings as an integral unit therewith to receive the ends of the shaft of the agitating or conveying apparatus, whilst the intermediate section or sections of the drying chambers may consist of plain tubes flanged at both ends with a steam jacket or jackets, so that the flanges of abutting sections may be bolted together to form a continuous drying chamber or combined drying chamber and steam jacket. The shafts or axles of the agitating or conveying apparatus are made up of sections secured together by means of flanged or other couplings to form a continuous shaft or axle.

Some of the apparent advantages of this construction are that the sections can be standardized or made of uniform size and produced in quantities, the difficulty of transport is largely eliminated, and the sections can be made of such a size as to enable them to be easily handled and erected and introduced into the fishing vessel or building without extensive structural alterations. Moreover, the plant can be readily dismantled and transferred to any other fishing vessel or position.

The sectional construction also enables the size of the plant to be readily suited to requirements by the addition to or removal from the plant of any desired number of sections.

The steam jackets may extend either completely or only partially around the drying chambers.

The sections may be built up as units each consisting of an inner tube or chamber and an outer steam jacket or jackets, so that the units may be assembled and bolted together end to end.

In order that the invention may be more clearly understood, reference is hereinafter made to the accompanying explanatory drawings illustrating one type of fish meal plant according to the present invention.

Fig. 1 is a vertical sectional view through the apparatus, Fig. 2 is an end view thereof and Fig. 3 is a detail sectional view of a drying chamber taken in a horizontal plane.

Figs. 4 and 5 are detail views illustrating a modified construction of joint for the sections.

The plant illustrated comprises a series of drying chamber sections 1 having end flanges 2 which are bolted or otherwise secured together to form a continuous drying chamber. Any number of such sections may be coupled together end to end. In Fig. 1 each drying chamber is shown composed of two such sections and the drying chambers are connected at their ends by flanges 3 and 4 to end sections 5 which are constructed complete with shaft bearings 6 to receive the shaft 7 of the stirrers 8 and worm conveyor 9. The shaft 7 is also made in two sections coupled together by a flanged coupling 10.

Each drying chamber section 1 is fitted with a steam jacket 11 and adjacent steam jackets may be connected by connecting pipes 12 as shown in Fig. 3, which shows a drying chamber composed of four intermediate sections 1 with steam inlet and outlet connections 13 and 14 respectively for supplying steam to the steam jackets 11.

The fish material may be fed to the first drying chamber through a feed hopper 15 likewise bolted by means of a flanged joint 16 to the first end section 5. The branches 17 and 18 represent hot air inlet and outlet connections respectively, but it is to be understood that the invention is not limited to any specific mode of treatment of the fish material in the drying cylinders, which may be effected with or without the use of steam, hot air or a combination thereof circulated in either or both directions or first in one direction and then in the opposite direction through any one or more of the drying chambers. The invention is also not limited to the specific means shown for agitating and conveying the material through the plant or to the parallel horizontal arrangement of the drying chambers, which may, if desired, be arranged to incline downwards towards their discharge ends. Also it may be convenient to join the sections of the drying chambers together by the use of any other form of coupling other than flanged bolted joints.

Figs. 4 and 5 illustrate a modified construction in which the steam jackets 11 of the sections 1 are made continuous throughout the length of the drying chamber by continuing the steam jacket 11 to the end of each section 1 and forming flanges 19 at each end of the steam jacket 11, the inner tubular section 1 and the outer steam jacket 11 being connected together at their ends by annular webs 20 which are formed with apertures 21 for the through passage of steam from one steam jacket to the next.

It is to be understood that the sections 1 need not necessarily be tubular as shown, nor need the steam jackets 11 necessarily extend wholly around the drying sections 1. The drying chamber may, for instance, be provided with an upper or lower steam jacket or with a steam jacket on one or both sides.

The improved construction enables the plant to be erected, for example, transversely alongside the bulkhead of a vessel, so that the plant occupies a minimum of space in the fore and aft direction.

Claims:

1. A fish meal plant including a tubular drying chamber, a heating jacket fitted to said drying chamber, said jacketed drying chamber being constructed in sections of a convenient length and detachably coupled together end to end, a central shaft section for each section of jacketed drying chamber, said shaft sections corresponding to the length of each jacketed drying chamber section, couplings for coupling said shaft sections together, and agitating or agitating and conveying devices fitted to said shaft sections.

2. A sectional fish meal plant comprising a plurality of parallel tubular drying chambers, each of said drying chambers being built up of standardized sections coupled together and including a heating jacket, a central shaft extending through each drying chamber, said shaft being built up of standardized sections coupled together and uniform in size with the sections of the drying chambers, agitating and conveying devices fitted upon said shafts, end sections connecting said drying chambers end to end in series and constructed to form bearings for said shafts, mechanism for rotating said shafts, a feed hopper for supplying material to the drying chambers, and hot fluid inlet and outlet connections to said drying chambers for circulating hot fluid therethrough.

In testimony whereof we affix our signatures.

HAROLD STANLEY ROWTON.
VOLKMAR WALTER HÄNIG.